United States Patent [19]

Maezuru et al.

[11] Patent Number: 5,695,043

[45] Date of Patent: *Dec. 9, 1997

[54] METHOD OF AND AN APPARATUS FOR CONVEYING OBJECTS FOR INSPECTION

[75] Inventors: Susumu Maezuru; Kanji Saitoh, both of Kawasaki, Japan

[73] Assignee: Ikegami Tsushinki Co., Ltd., Japan

[*] Notice: The terminal 44 months of this patent has been disclaimed.

[21] Appl. No.: 768,562

[22] PCT Filed: Jan. 24, 1991

[86] PCT No.: PCT/JP91/00076

§ 371 Date: Sep. 26, 1991

§ 102(e) Date: Sep. 26, 1991

[87] PCT Pub. No.: WO91/11376

PCT Pub. Date: Aug. 8, 1991

[30] Foreign Application Priority Data

Jan. 26, 1990 [JP] Japan ................... 2-6723 U
May 25, 1990 [JP] Japan ................... 2-54047 U

[51] Int. Cl.⁶ ................................................. B65G 17/46
[52] U.S. Cl. ............................ 198/689.1; 198/803.5
[58] Field of Search ...................... 198/689.1, 803.5, 198/500, 848

[56] References Cited

U.S. PATENT DOCUMENTS

| | | | |
|---|---|---|---|
| 1,278,537 | 9/1918 | Wegner | 198/689.1 |
| 3,168,958 | 2/1965 | Grossi | 198/689.1 |
| 3,225,716 | 12/1965 | Kross et al. | 198/500 |
| 4,555,013 | 11/1985 | Franklin | 198/689.1 |
| 4,703,566 | 11/1987 | Kwoka | 198/848 |

FOREIGN PATENT DOCUMENTS

| | | |
|---|---|---|
| 54-90775 | 7/1979 | Japan . |
| 59-22805 | 2/1984 | Japan . |
| 59-100709 | 7/1984 | Japan . |
| 59-127007 | 8/1984 | Japan . |
| 60-69219 | 5/1985 | Japan . |
| 60-119986 | 8/1985 | Japan . |
| 60-191901 | 9/1985 | Japan . |
| 62-74819 | 9/1985 | Japan . |
| 61-211209 | 9/1986 | Japan . |

OTHER PUBLICATIONS

International Search Report.

Primary Examiner—Joseph E. Valenza
Attorney, Agent, or Firm—Fish & Richardson P.

[57] ABSTRACT

An apparatus for conveying objects includes a conveyor belt. A belt core material of the conveyor belt comprises rigid thread elements. Apertures for communicating the inner and outer surfaces of the belt core material are partly blocked by a plurality of annular seal strips each of which is continuous in a belt moving direction. The objects are seated over adjacent seal strips spaced apart from each other. The objects are conveyed while being drawn by a negative pressure, produced by a suction unit and introduced from the inner surface side of the conveyor belt through the apertures. During the conveyance, the objects are inspected. The objects supplied at optional intervals are stabilized with a constant suction force and conveyed. Thereafter, the objects are reliably turned over and transferred to another conveyor apparatus of the next stage.

12 Claims, 7 Drawing Sheets

METHOD OF AND AN APPARATUS FOR CONVEYING OBJECTS FOR INSPECTION

BACKGROUND OF THE INVENTION

1. Field of the Invention

The present invention relates to a method of and an apparatus for conveying objects for inspection, employed in a system for inspecting small objects for flaws such as tablets, while conveying the objects.

2. Discussion of the Related Art

As example of an apparatus for conveying and inspecting objects for flaws is disclosed in Japanese Unexamined Utility Model Publication No. 60-119986 and Japanese Unexamined Patent Publication No. 62-74819. According to the disclosures (hereinafter referred to as the first prior art), two drums are arranged one upon another, and each drum has rows of apertures for receiving tablets to be inspected. From a position facing the tablets, a camera unit photographs and inspects the tablets. This first prior art is able to inspect both sides of the tablets by turning over the tablets while transferring them from the upper drum to the lower drum.

Japanese Unexamined Patent Publication No. 59-22805 (hereinafter referred to as the second prior art) discloses another example of the conveyor apparatus. This disclosure forms apertures at regular intervals at the center of a timing belt, and conveys objects placed on the apertures while drawing the objects by suction. According to this second prior art, a vertical positional relationship between the objects and the timing belt can be inverted during the conveyance, so that, with two sets of the apparatus of the second prior art, both sides of the objects can be inspected.

Japanese Unexamined Patent Publication No. 61-211209 (hereinafter referred to as the third prior art) discloses still another example of the conveyor apparatus. This disclosure forms a slit with a pair of plates, and arranges cords over the slit. The cords each have a circular cross-section and are supported at regular intervals by guide rails. Objects to be inspected are placed over the cords, and a negative pressure is applied to the slit to draw the objects. Similar to the second prior art, the third prior art can easily turn over the objects, and even if the objects are irregularly spaced apart from one another, can handle the objects with no trouble.

The first prior art, however, has problems in that the objects to be inspected are easily disarranged when they are received in the apertures or, particularly when they are transferred from the upper drum to the lower drum, the objects are not always correctly turned over, and the inspected objects are sometimes not delivered and the undelivered objects and the newly fed objects are laid upon one another to break them.

The second prior art has a problem in that, although it can solve the problems of the first prior art, the objects are not correctly conveyed if they are irregularly spaced apart from one another on the timing belt because this causes fluctuation in the suction force.

The third prior art has a problem in that, although it can solve the problems of the first and second prior arts, the circular cords may slip on a driver pulley to vary the conveyance time of the objects from a photographing position to a position for separating the objects according to inspection results, and thus cause erroneous separation.

If a pair of the cords slip at different times, the objects may be horizontally turned and thereby reduce the reliability of the inspection results. The cords are sometimes turned or twisted in a circumferential direction around the circular cross-section, to drop the objects in the slit. In this case, the objects are erroneously determined to be broken.

SUMMARY OF THE INVENTION

An object of the present invention is to convey objects to be inspected at optional intervals to an inspection area while drawing the objects with a constant suction force produced by a negative pressure, as well as preventing an approach of strips disposed on each side of a negative pressure producing portion facing the objects.

Another object of the invention is to convey objects to be inspected while stably maintaining the position of the objects without turning or dropping the objects.

Still another object of the invention is to easily and reliably turn over objects such as tablets to be inspected and convey the objects to an inspection area, to thereby improve the reliability of inspection.

To achieve the objects, a method for conveying objects for inspection according to the invention seats the objects to be inspected over adjacent seal strips spaced apart from each other and disposed parallel to each other in the conveying direction of a rigid conveyor belt, guides a negative pressure from the inner surface side of the conveyor belt to a space between the adjacent seal strips through apertures of the conveyor belt distributed between the adjacent seal strips at a rate of at least one for each of the objects, and conveys the objects while drawing the objects to the seal strips with a suction force produced by the negative pressure.

According to this arrangement, the negative pressure is guided to the space between the adjacent seal strips of the conveyor belt through the apertures, to draw the objects to the seal strips and convey and inspect the objects.

The apertures of the conveyor belt are distributed at a rate of at least one for each of the objects, and the objects are seated over the adjacent seal strips and drawn by a substantially constant suction force applied through the apertures, even if the objects are fed at optional intervals onto the seal strips in the conveying direction. The rigidity of the conveyor belt sufficiently prevents the adjacent seal strips from approaching each other due to the negative pressure applied between the adjacent seal strips. As a result, the seal strips can convey the objects while stably maintaining the position of the objects with no turns and twists occurring on the seal strips.

A wall of the conveyor apparatus facing the inner surfaces of the seal strips may have apertures or slits for guiding a negative pressure to draw the inner surfaces of the seal strips. This arrangement prevents a decrease of the negative pressure applied to the space between the seal strips, thereby stably conveying the objects on the seal strips along the wall.

A wall of the conveyor apparatus facing the space between the adjacent seal strips may have a slit for guiding a negative pressure into the space. Since the slit collectively guides the negative pressure to the space between the adjacent seal strips, a suction force for drawing the objects to the seal strips is improved.

An apparatus for conveying objects for inspection according to the invention comprises:

a conveyor belt for conveying the objects to be inspected;

a drive unit engaging with the conveyor belt with no slippage in a conveying direction to drive the conveyor belt; and a suction unit for guiding a negative pressure from the inner surface side of the conveyor belt to a space between adjacent seal strips through apertures formed through a belt core material of the conveyor belt, and drawing the objects to the seal strips with a suction force of the negative pressure.

The conveyor belt comprises the annular belt core material made of many rigid thread elements. The belt core material has apertures formed through the material and distributed at a rate of at least one for each of the objects. The conveyor belt further comprises a plurality of annular seal strips extending in the conveying direction and integrally formed with the belt core material so as to block the communication of the apertures of the belt core material. The seal strips are arranged parallel to and spaced apart from one another so that the objects are seated over the adjacent seal strips.

According to this arrangement, the negative pressure produced by the suction unit is guided from the inner surface side of the conveyor belt to the outer surface of the conveyor belt facing the space between the adjacent seal strips through the apertures of the belt core material. Since the inner and outer surfaces of the seal strips are isolated from each other, the negative pressure is collectively guided to the space between the adjacent seal strips through the apertures of the belt core material. The apertures of the belt core material are distributed at a rate of at least one for each of the objects are properly seated over the adjacent seal strips by the substantially constant suction force, even if the objects are fed at optional intervals in the conveying direction onto the seal strips.

Since the thread elements have rigidity and since the seal strips and belt core material are integrally formed, the adjacent seal strips do not approach each other even if the negative pressure is collectively guided to the space between the adjacent seal strips. In addition, the seal strips will not turn or twist.

The conveyor belt is engaged with and driven by the drive unit with no slippage between them. Namely, the seal strips are driven at a constant speed with no fluctuation in the speed and no speed difference between the adjacent seal strips.

In this way, the objects to be inspected are seated over the adjacent seal strips by the constant suction force, and the seal strips are driven at a constant speed. Since the seal strips are not turned, twisted, or brought close to each other, or no speed difference occurs between the adjacent seal strips, the objects are conveyed at a constant speed with their position stably maintained.

The conveyor belt may have three or more seal strips to convey rows of the objects. This arrangement simultaneously conveys the rows of the objects, thereby improving conveyance efficiency while keeping a conveying speed for securing inspection reliability. Namely, this arrangement improves inspection efficiency while securing inspection reliability.

Each of the seal strips may include an inner seal strip protruding from the inner surface of the belt core material, or may comprise the inner seal strip only. The inner seal strip suppresses a leakage of air from the inner side of the seal strip, thereby increasing the suction force of the negative pressure.

The suction unit may be a box-like unit having an outer wall facing the inner surface of the conveyor belt. The outer wall may have slits or apertures facing the inner seal strips. Through these slits or apertures, the inner seal strips are drawn by a proper negative pressure and stably move along the outer wall of the suction unit. When the outer surfaces of the seal strips are downwardly oriented to hold the objects in a hung manner, the negative pressure acting through the slits or apertures formed on the outer wall prevents a sag of the conveyor belt as well as a decrease of the negative pressure acting in the space between the adjacent seal strips.

Similarly, the suction unit may be a box-like unit having an outer wall facing the inner surface of the conveyor belt. The outer wall at an area facing the space between the adjacent seal strips may have a slit for drawing the objects to be inspected. In this case, the negative pressure is applied to the space between the adjacent seal strips through the slit.

The conveyor belt may include a seat protruding from the outer surface of the conveyor belt, for stably receiving the objects to be inspected. The seat may be formed integrally with each seal strip. The seat is easy to form, and a sealing function is further improved.

The conveyor belt may have holes at equal intervals in the conveying direction, and the drive unit may have sprockets engaging with the holes. Since the conveyor belt engages with the sprockets, the conveyor belt is driven by and in synchronism with the sprockets at a constant speed with no speed fluctuation.

A part of the inner surface of the conveyor belt may have irregularities formed in the conveying direction, and the drive unit may have timing pulleys engaging with the irregularities. Since the conveyor belt engages with the timing pulleys, the conveyor belt is driven by and in synchronism with the timing pulleys at a constant speed with no speed fluctuation.

The belt core material may be made of thread elements woven into a net. This may easily form apertures on the conveyor belt.

The belt core material may be made of thread elements that are orthogonal to the conveying direction in a blind-like configuration. In this case, the rigidity of the belt core material works only orthogonally to the conveying direction, thereby surely preventing the adjacent seal strips from approaching each other. Since the rigidity of the belt core material in the conveying direction is sufficiently reduced, a bending force produced at a turning point of the belt core material is reduced, and therefore, a linearity of the conveyor path is readily maintained. As a result, the position of the objects to be inspected is further stabilized, and a required driving force of the drive unit is reduced.

The thread elements may be coated with good lubricant. The coated lubricant sufficiently improves the durability of the thread elements, makes the thread elements slide smoothly over the outer wall of the suction unit, and prevents the conveyor belt from being caught by the outer wall of the suction unit, thereby reducing a required driving force of the drive unit.

DESCRIPTION OF THE PREFERRED EMBODIMENTS

FIGS. 1 to 10 show the embodiments of an apparatus for conveying objects for inspection according to the invention.

Figure 1:
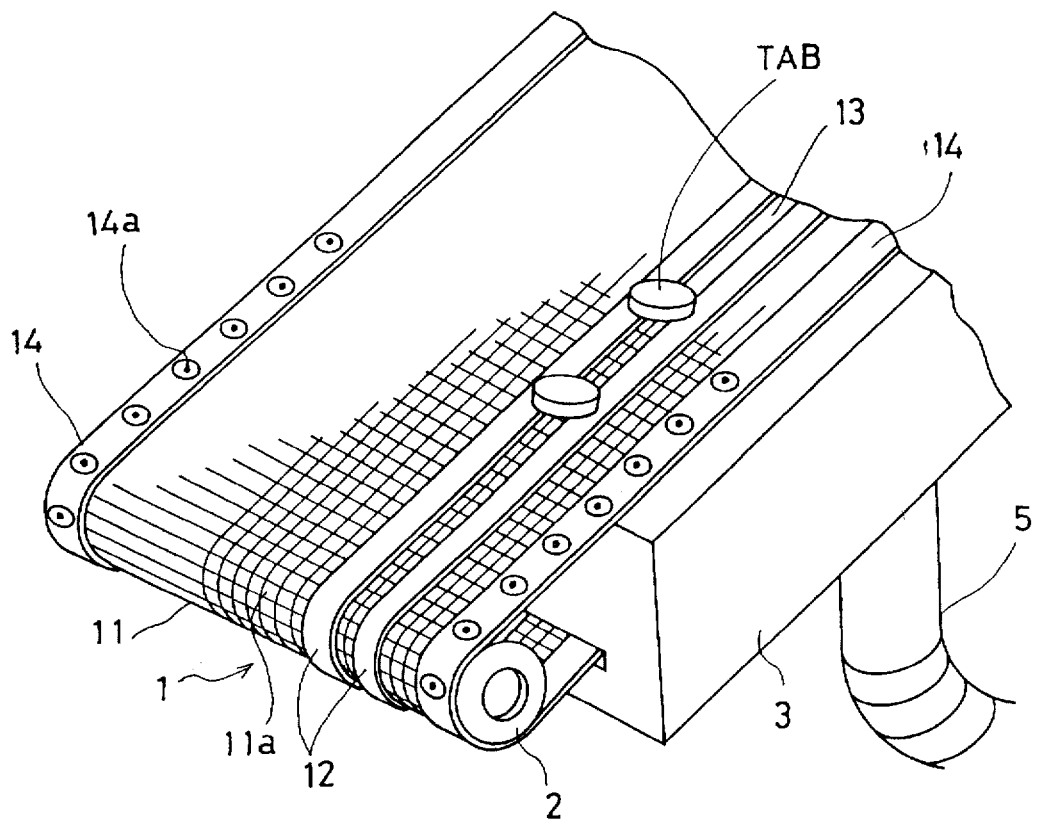
FIG. 1 is a perspective view showing an apparatus for conveying objects for inspection according to a first embodiment of the invention.
Figure 2:
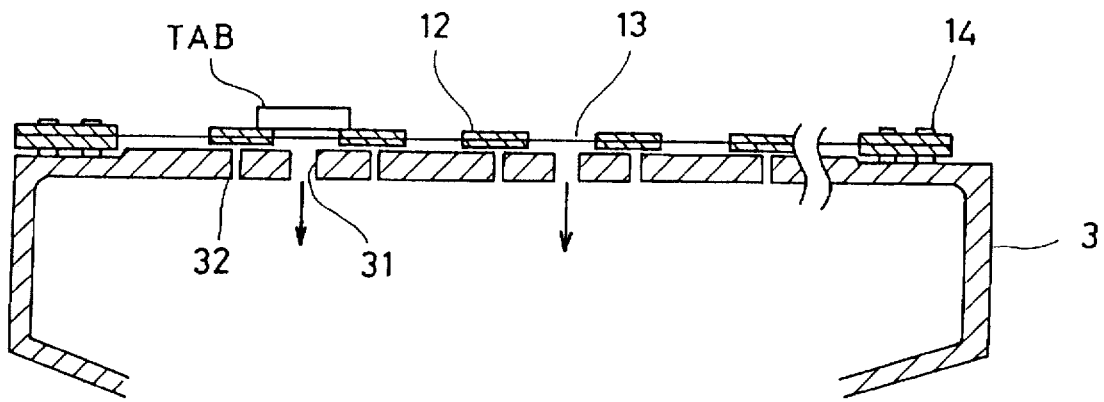
FIG. 2 is a cross-sectional side view showing the first embodiment.
Figure 3:
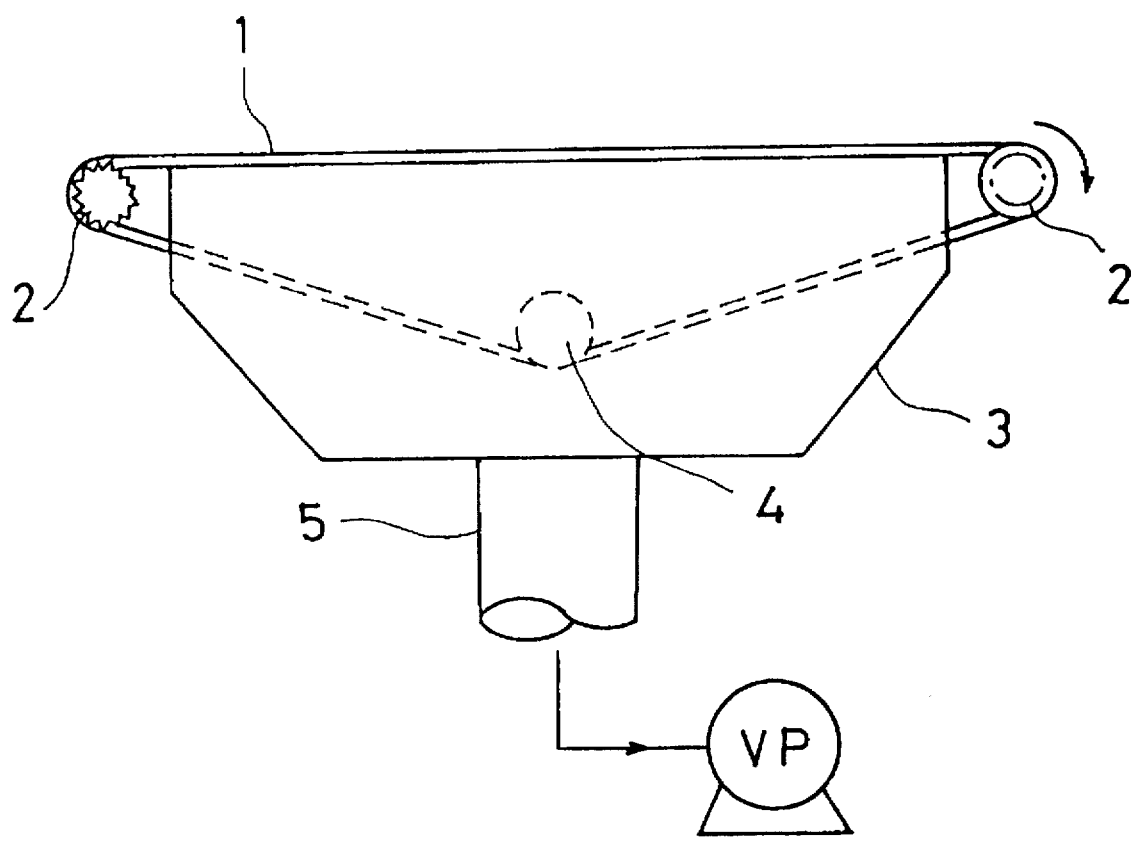
FIG. 3 is a front view schematically showing the first embodiment.

FIGS. 1 to 3 show the first embodiment. A conveyor belt 1 comprises an annular belt core material 11 made of glass fibers serving as the thread elements woven into a net and coated with ethylene tetrafluoride resin (trade name, Teflon) which is a good lubricant. Inner and outer surfaces of the belt core material 11 communicate with each other through apertures 11 a formed through the glass fibers. The apertures 11 a are distributed at a rate of at least one for each object to be inspected. The thread elements forming material 11core material 11 must have rigidity to prevent adjacent seal strips from approaching each other due to a negative pressure produced by a suction box. Accordingly, the thread elements may be glass fibers but may also be a steel wire mesh.

When the steel wire mesh having a particularly high rigidity is used, thread elements extending in the conveying direction may be eliminated and only thread elements extending across the belt may be used to form the core material 11 into a blind-like configuration. This arrangement reduces a bending force produced at a turning point of the belt core material 11, and the linearity of the conveying path is easily maintained. As a result, a posture of the objects is stabilized during conveyance, and a required driving force of the conveyor belt 1 is reduced.

A plurality of seal strips 12 (only two of them are shown in FIG. 1 for the sake of simplicity) are arranged in rows on the outer and inner surfaces of the belt core material 11. Each of the seal strips 12 continuously extends in the conveying direction of the conveyor belt 1. A space 13 extending in the conveying direction is formed between adjacent seal strips 12. Objects such as tablets TABs to be inspected are supplied and seated on the adjacent seal strips 12 over the space 13 between them.

Each of the seal strips 12 is made of resin such as ethylene tetrafluoride resin, or soft material such as rubber. The ethylene tetrafluoride resin may be coated over the surfaces of the seal strips 12. The seal strips 12 may be adhered or sprayed to the belt core material 11. It is possible to form the seal strip all over the surface of the belt core material 11, and then partly remove it to form the spaces 13.

According to this embodiment, the seal strips 12 protrude from the inner and outer surfaces of the belt core material 11 so that the inner seal strips protruding from the inner surface of the belt core material 11 effectively suppress a leakage of air from the inside of the belt core material 11, to increase a suction force produced by negative pressure. On the other hand, the outer seal strips protruding from the outer surface of the belt core material 11 serve as seats for seating the objects TABs. To provide the seating function, the thickness of each seal strip 12 on the outer surface of the belt core material 11 is set such that the center of each object TAB having an elliptic or a circular cross-sectional shape does not contact with the surface of the belt core material 11. On the other hand, the thickness of each seal strip 12 on the inner surface of the belt core material 11 is sufficiently thin to cover the glass fibers of the belt core material 11 and provide a flat plane.

To at least provide the essential function of blocking communication between the inner and outer surfaces of the belt core material 11, the seal strips 12 may be arranged only on the outer surface, inner surface, or at the center of the belt core material 11. In this case, the seal strips 12 may be tapes adhered to the surface.

At each edge of the conveyor belt 1, there is arranged a reinforcing material 14 on each face of the belt core material 11. The reinforcing material 14 is made of rubber or cloth and continuous in the conveying direction with a predetermined width. Holes 14a are opened on the reinforcing material 14 at equal intervals in the conveying direction. A reinforcing fitting is inserted and fixed in each of the holes 14a.

The conveyor belt 1 is driven by a drive unit, which includes sprockets 2. The sprockets 2 are arranged at each end in the conveying direction and engaged with the holes 14a. The sprockets 2 are driven at a constant speed by a motor (not shown), thereby driving the conveyor belt 1 at a constant speed with no slippage.

To drive the conveyor belt 1 with no slippage, the inner surface thereof at each edge may have irregularities so that the irregularities and timing pulleys may engage with each other for driving the conveyor belt 1. In this case, each timing pulley preferably should have a collar that engages with a side edge of the irregularity formed portion of the conveyor belt 1, to prevent a slippage of the conveyor belt 1 in a crosswise direction.

A lower part of the conveyor belt 1 is pulled into a suction box 3 serving as the suction unit, and an upper part of the conveyor belt 1 runs along an upper wall of the suction box 3. The conveyor belt 1 in the suction box 3 is stretched around a tension sprocket 4, which provides the conveyor belt 1 with proper tension.

The suction box 3 has slits 31 for drawing the objects to be inspected. Each of the slits 31 is formed through the upper wall of the suction box 3 at a position corresponding to the space 13 between the adjacent seal strips 12. Slits or apertures 32 for drawing the seal bands 12 are also formed through the upper wall of the suction box 3 at positions corresponding to the seal strips 12. The width of the slit 32 is narrower than that of the slit 31. An opening is formed at the center of the bottom wall of the suction box 3, and a duct 5 is connected to the opening. A vacuum pump VP draws air from the suction box 3 through the duct 5, thereby producing a negative pressure on the slits 31 for drawing the objects to be inspected and on the slits or apertures 32 for drawing the seal strips 12 from the inside of the suction box 3. The duct 5 may be connected to an optional location on the side face of the suction box 3, instead of the bottom of the suction box 3.

The width of the slit 31 for drawing the objects is set such that the negative pressure stably draws the objects (tablets) TABs to the seal strips 12 through the space 13. The width or inner diameter and the number of the slits or apertures 32 for drawing each seal strip 12 are set such that the seal strip 12 is drawn to the upper wall of the suction box 3 with a proper force so that, in combination with the smoothness of the inner portion of the seal strip 12, the up and down movements of the seal strip 12 are suppressed. When the objects are conveyed in a hung manner on the lower part of the conveyor belt 1, the negative pressure will not act on the objects if the conveyor belt 1 sags to separate from the outer wall of the suction box 3. In this case, the width or inner diameter and the number of the slits or apertures 32 for drawing the seal strips 12 must be determined to draw the seal strips 12 with a stronger force. Even when the seal strips 12 are strongly drawn to the outer wall of the suction box 3, frictional resistance between the seal strips 12 and the outer wall of the suction box 3 may be reduced if the inner circumferential surfaces of the seal strips 12 are coated with a good lubricant such as ethylene tetrafluoride and smoothly finished. This enables the suction force to effectively draw the seal strips 12 through the slits or apertures, and the conveyor belt 1 to be driven smoothly without being caught by the outer wall of the suction box 3.

According to the above arrangement, a strong negative pressure is collectively guided to each space 13 and evenly acts on the objects (tablets) TABs, to sufficiently draw the objects TABs to the seal strips 12 without causing dislocation thereof. The objects are properly conveyed, therefore, even if the objects are supplied to the apparatus at optional intervals.

Since the conveyor belt 1 is driven at a constant speed in synchronism of the rotation speed of the sprockets 2 with no slippage, the objects TABs are also conveyed at the same speed with no dislocation as mentioned above. When the apparatus if applied to a system for inspecting the surfaces of objects, as explained later, a conveyance time from a photographing stage to a stage for selecting and discharging unacceptable objects will never vary, to thereby ensure selection accuracy. When both sides of each object are inspected in the inspection system, objects drawn to and conveyed by the lower face (upper face) of the conveyor belt 1 may surely be turned over and transferred onto the upper face (lower face) of a conveyor belt of the next conveyor apparatus.

Since the conveyor belt 1 is single, the adjacent seal strips 12 will never move relative to each other, so that, unlike the conventional apparatus using two conveyor belts, a speed difference never occurs between the seal strips 12, and the seal strips 12 are never turned or twisted. The objects TABs, therefore, are stably conveyed with no turn or drop. This improves the reliability of inspection.

To convey the objects TABs in rows, the invention arranges a plurality of the seal strips 12 on the single conveyor belt 1. Since the invention surely conveys the rows of the objects under the same condition, the invention can simplify the conveyance system, increase the number of objects to be inspected in a unit time, and improve the efficiency of inspection.

Figure 4A:
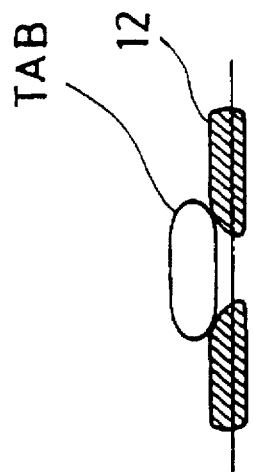
FIGS. 4(A) to 4(C) are sectional views showing modifications of the cross-sectional shape of a seal strip according to the invention.
Figure 4B:
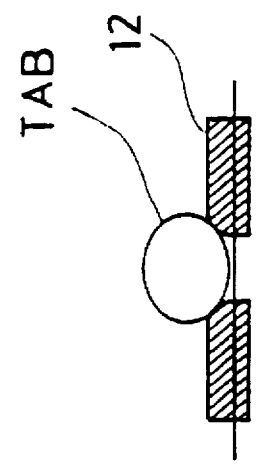
Figure 4C:
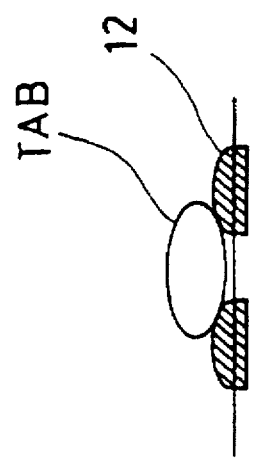

When the objects have a large curvature, the cross-sectional shape of each seal strip 12 may be rounded as shown in FIGS. 4(A) to 4(C) to stably receive the objects. When the objects are flat, the flat cross-sectional shape shown in FIG. 2 will be adapted. In this way, the cross-sectional shape of the seal strip 12 is suitably designed according to the shape of objects to be inspected.

Figure 5:
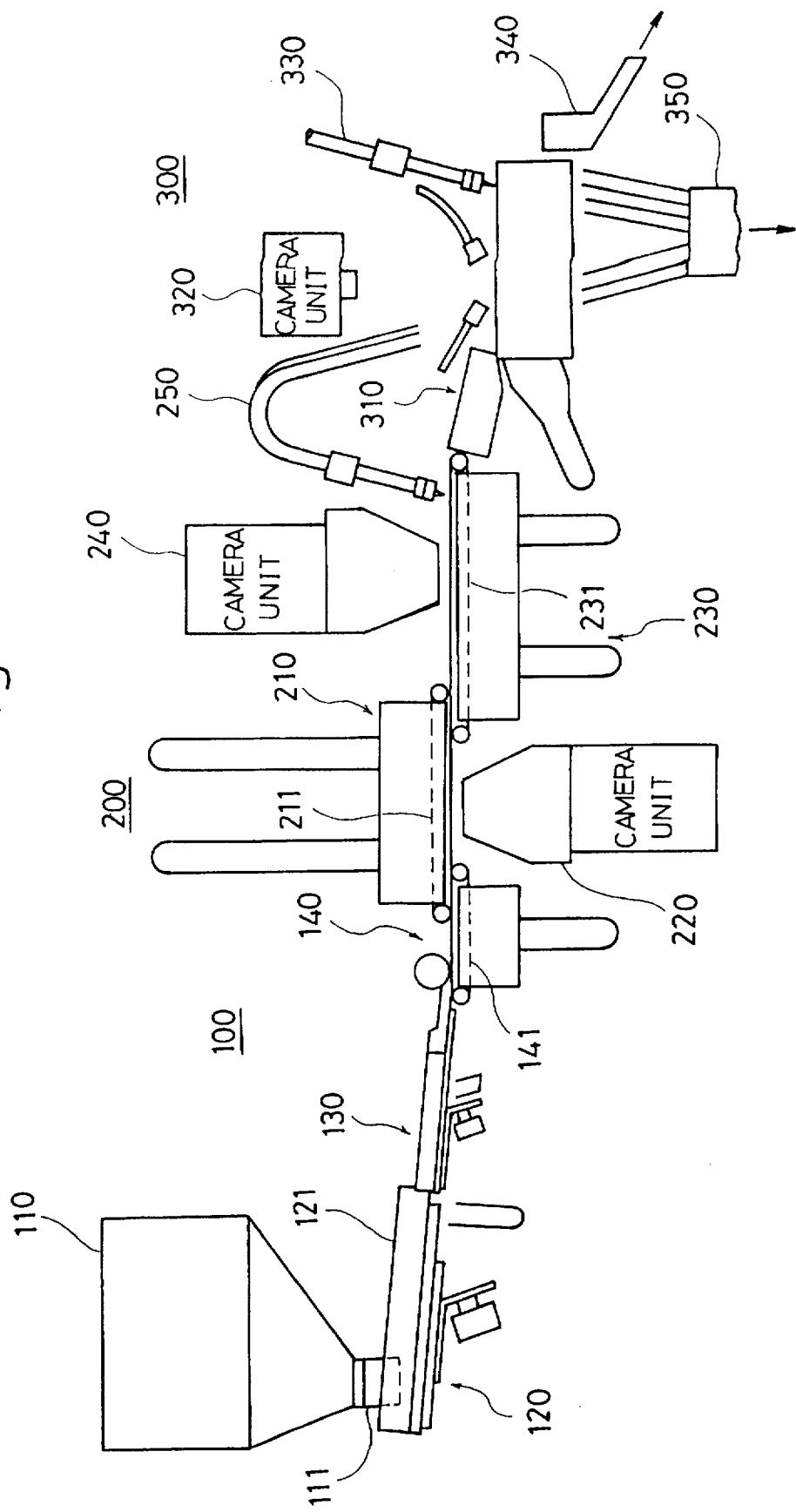
FIG. 5 is a front view schematically showing an inspection system employing the apparatus of the invention.
Figure 6:
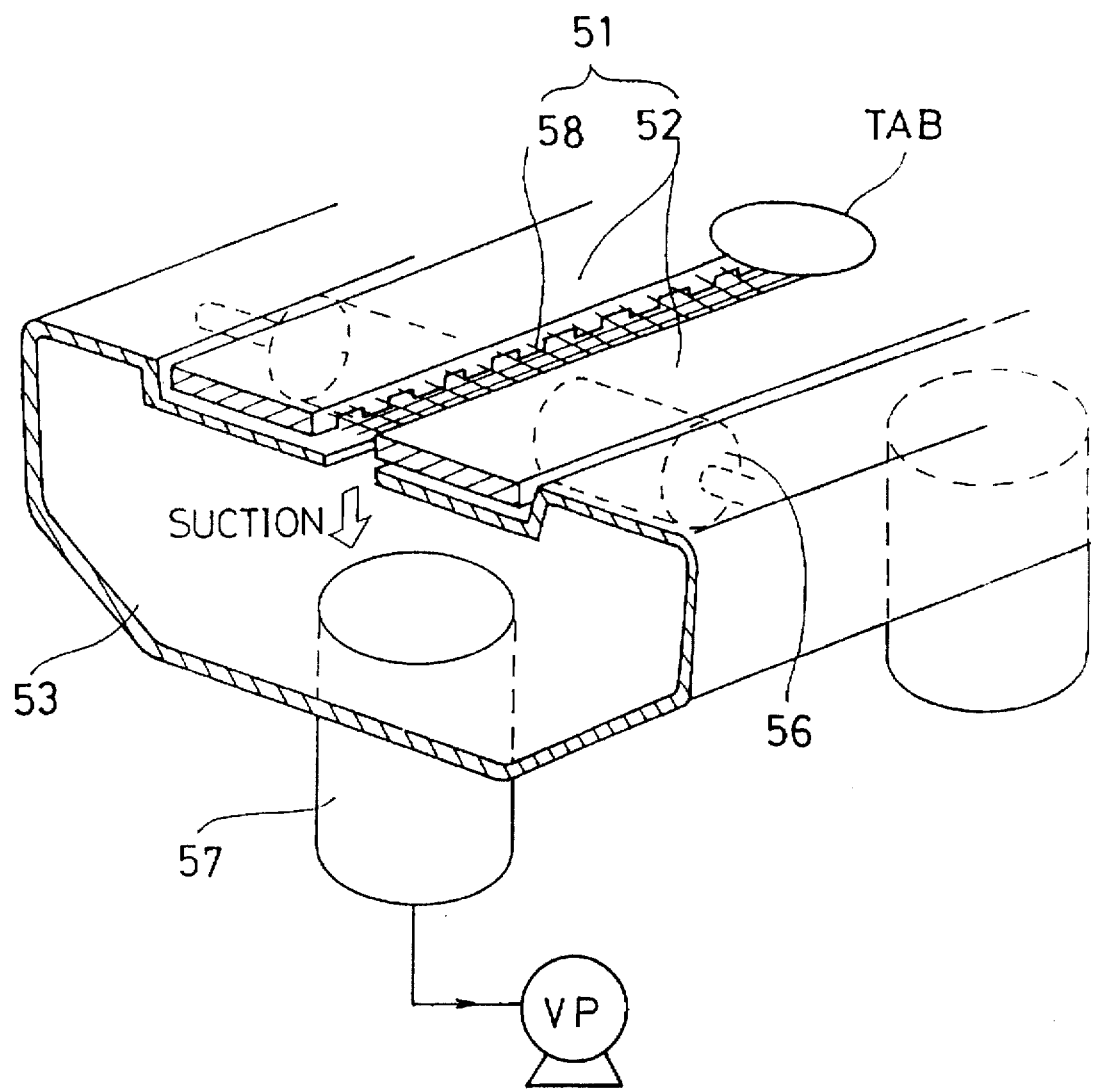
FIG. 6 is a partly broken perspective view showing an apparatus for conveying objects for inspection according to a second embodiment of the invention.

FIG. 5 schematically shows a system for inspecting the surfaces of small objects such as tablets for printing conditions and flaws, employing a plurality of the conveyor apparatuses each of the above arrangement. In the figure, numeral 100 denotes an object supplying and aligning stage, 200 a both sides inspecting stage, and 300 a side face inspecting stage. This inspection system will be roughly explained.

Objects to be inspected are stored in a hopper 110 and then supplied to a conveyor belt 121 of a supply unit 120 through a hopper discharge port 111. On the conveyor belt 121, broken objects are rejected, and the remaining objects are supplied to an aligning unit 130. The objects are arranged at substantially equal intervals on a first conveyor belt 141 of a first conveyor apparatus 140, and conveyed under an upward facing state toward the both sides inspecting stage 200. Even if the objects are conveyed at irregular intervals, a function of the both sides inspecting stage 200 is not hindered.

When a suction force of the first conveyor belt 141 decreases at an end thereof, the objects conveyed under the upward facing state on the first conveyor belt 141 are drawn by a second conveyor belt 211 of a second conveyor apparatus 210 and conveyed thereby under a downward facing state. At this time, the back sides of the objects are photographed by a one-dimensional camera unit 220. In this way, the objects are transferred from the first conveyor belt 141 to the second conveyor belt 211 only through vertical movements caused by the vertical suction forces switched from one to another. Accordingly, as explained in the first embodiment, the objects will not be disordered nor left, and the objects are stably and reliably transferred from one belt to another. The objects drawn and conveyed by the second conveyor belt 211 are similarly transferred to a third conveyor belt 231 of a third conveyor apparatus 230 and conveyed thereby under an upward facing state. At this time, the surfaces of the objects are photographed by a one-dimensional camera unit 240. Unacceptable objects detected here are selected and discharged by a discharge unit 250.

The objects whose both sides have been inspected are conveyed to the side face inspecting stage 300. A posture changer 310 changes the laid posture of the objects into an upright posture, and a one-dimensional camera unit 320 entirely inspects the side face of each object. Unacceptable objects are selected an discharged by a discharge unit 330, and accepted objects are delivered through an accepted object delivery duct 340. The side face inspecting stage 300 has a discharge unit 350 for drawing and discharging powders from the inspected objects.

In this inspection system, the first and third conveyor apparatuses 140 and 230 among the first to third conveyor apparatuses 140, 210, and 230 have the same configuration as that of the embodiment of FIGS. 1 to 3. The second conveyor apparatus 210 may be realized by turning the embodiment upside down. The supply unit 120 and aligning unit 130 may be realized by using a supply unit 13 and an aligning unit 20 disclosed in Japanese Unexamined Patent Publication No. 63-259499 of this applicant. Also, the side face inspecting stage 300 may be realized by using a technique disclosed in Japanese Unexamined Patent Publication No. 63-152373.

FIGS. 6 to 9 show an apparatus for conveying objects for inspection according to the second embodiment of the invention.

In this embodiment, a conveyor belt 51 has seal strips 52. The inner circumferential surface of each seal strip 52 is irregularly formed into a timing belt shape. The irregularities engage with the tooth of each timing pulley 54 (a part of a drive unit) disposed outside a suction box 53, the tooth of each guide pulley 55 disposed inside the suction box 53, and the tooth of a tension pulley 56. The timing pulley 54 is driven by a motor to drive the conveyor belt 51. The suction box 53 is connected to a duct 57 through which air is discharged to introduce a negative pressure through a slit 58 to draw objects TABs to the seals trips 52 and convey the objects in a manner similar to the first embodiment. By removing outside members of a timing belt having a standard net-like belt core material, a plurality of seal strips 52 and slits 58 may be formed.

A recess 53a of the suction box 53 is to prevent a meandering of the conveyor belt 51. To prevent the meandering, guide pins may be arranged on each side of the conveyor belt 51.

The arrangements and functions of other parts of the second embodiment are the same as those of the first embodiment. In the figures, there are two seals strips 52. Similar to the first embodiment, it is possible to arrange three of more seals strips 52 to convey the inspection objects in rows.

Figure 7:
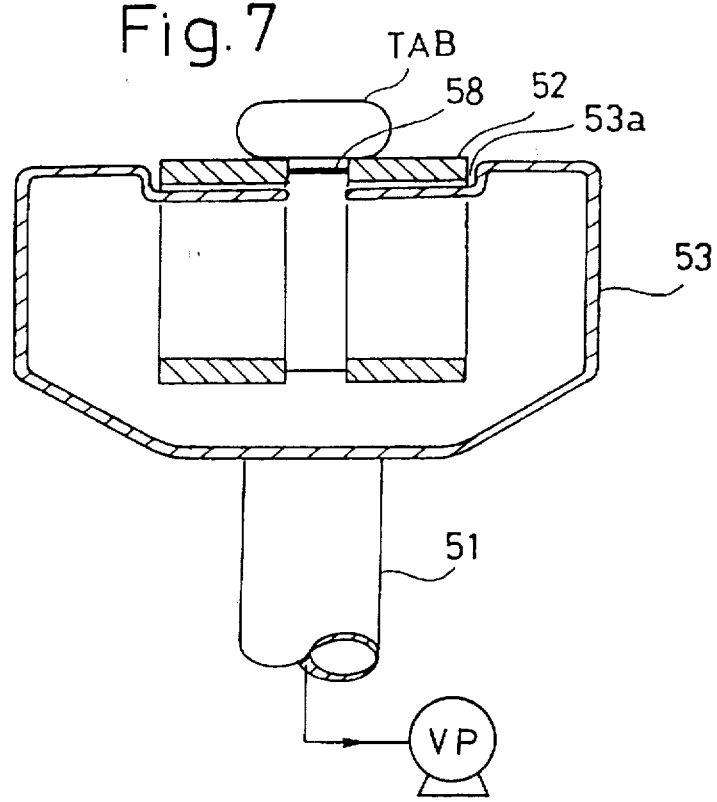
FIG. 7 is a cross-sectional side view showing the second embodiment.
Figure 10:
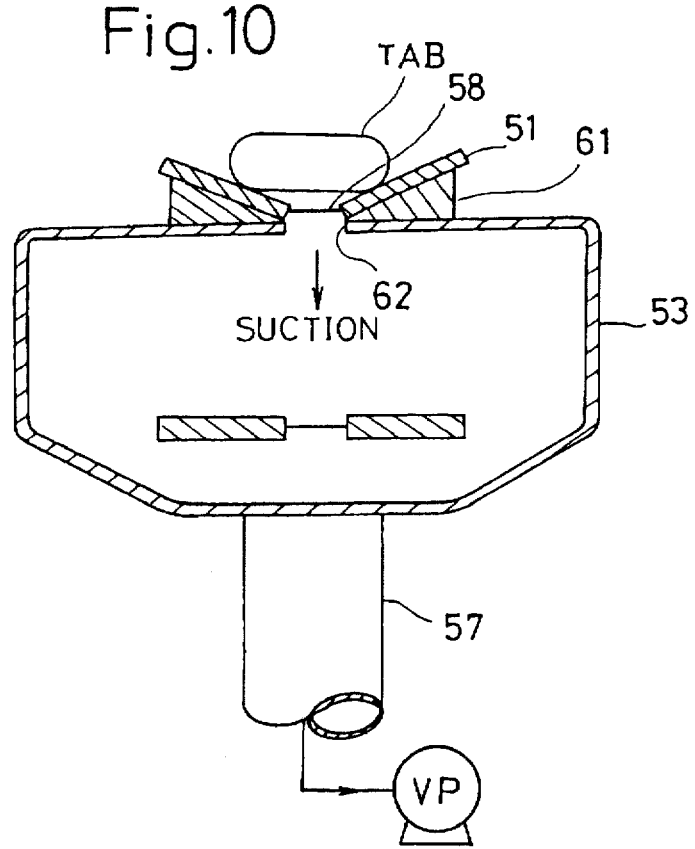
FIG. 10 is a corss-sectional side view showing an apparatus for conveying objects for inspection according to a third embodiment of the invention.
Figure 8:
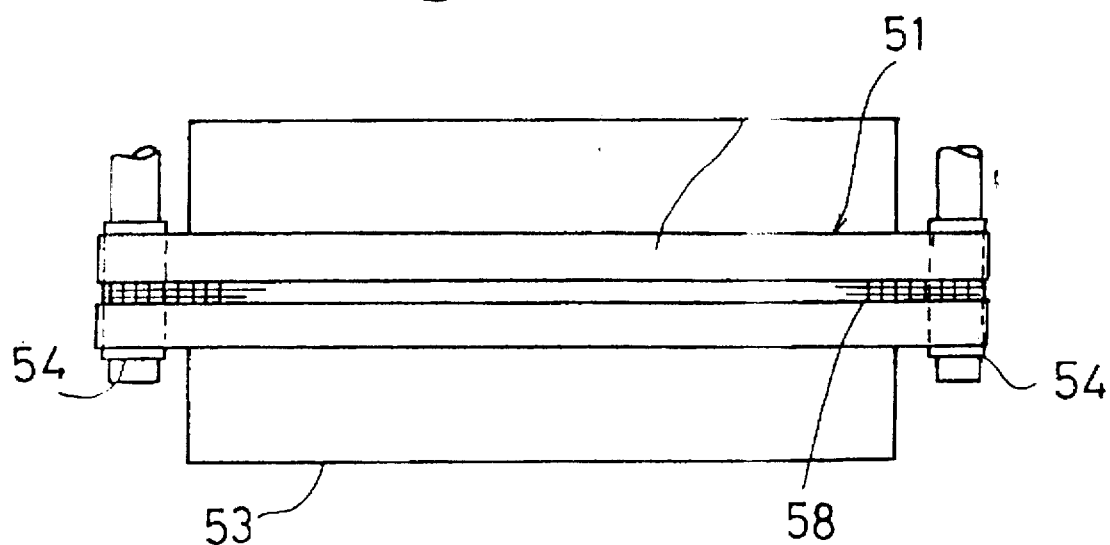
FIG. 8 is a plan view schematically showing the second embodiment.
Figure 9:
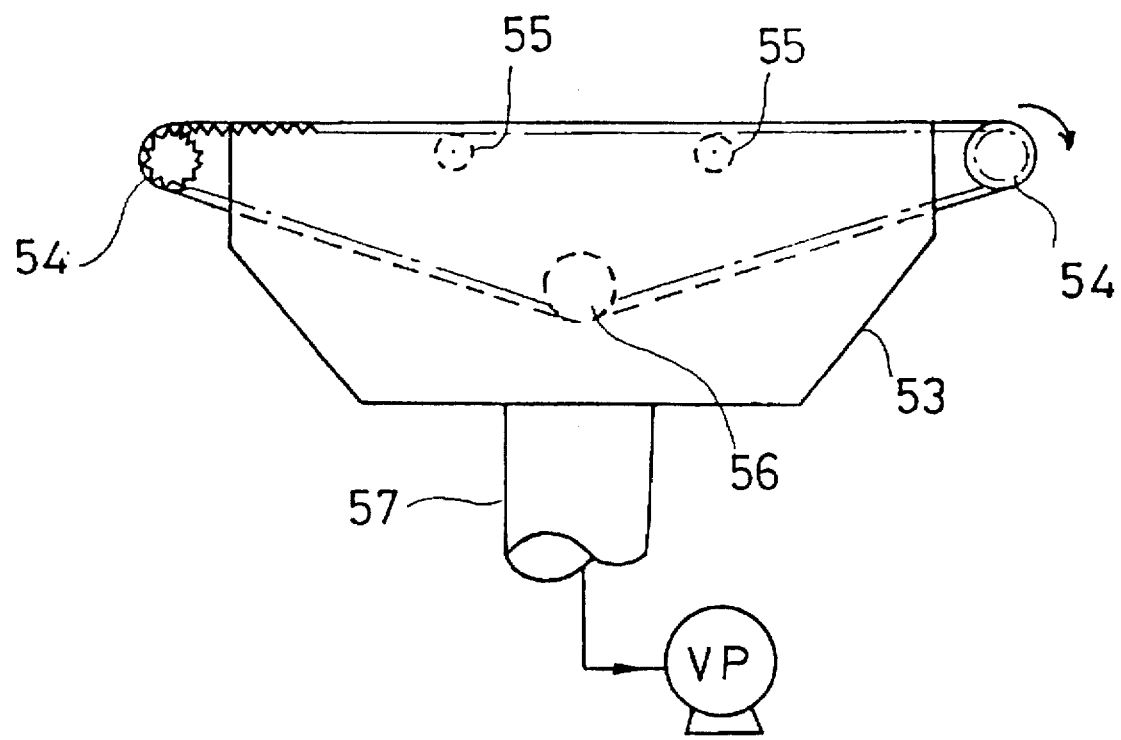
FIG. 9 is a front view schematically showing the second embodiment.

FIG. 10 shows the third embodiment which is a modification of the second embodiment. The same elements as those of FIG. 7 are represented with the same reference numerals. What is different from the second embodiment is that slanted blocks 61 facing each other are arranged on each side of the object drawing slit 62 of the suction box 53. The slanted blacks 61 tilt the conveyor belt 51 to more stably convey the objects (tablets) TABs as well as preventing a meandering of the conveyor belt 51.

The objects to be drawn and conveyed by the method and apparatus of the invention are not only medical tablets but also capsules, small pieces of candy, cosmetics, mechanical parts, buttons, etc.

As explained above, the present invention draws objects supplied at optional intervals to a conveyor belt with a constant sufficient negative pressure, and conveys them at a constant speed while keeping a stabilized posture without turning and dislocating the objects.

The invention reliably transfers the objects onto another conveyor belt after turning over the objects. In particular, when the invention is applied to an inspection system, the invention can improve the accuracy of identifying unacceptable objects and selecting unacceptable objects from acceptable objects.

The invention easily conveys inspection objects in rows, thereby improving work efficiency.

As explained above, a method of and an apparatus for conveying objects for inspection according to the present invention is very effective in improving inspection accuracy and inspection speed in inspecting objects for flaws such as tablets.

We claim:

1. A method of conveying objects for inspection, comprising the steps of:

arranging seal strips spaced apart from each other and in parallel to each other in a conveying direction on a rigid conveyor belt so that a space is provided between adjacent seal strips;

guiding a negative pressure to apertures or slits formed in a wall of a box-like structure to draw the seal strips to the wall;

seating the objects over adjacent seal strips;

providing a slit formed in the wall facing the space between the adjacent seal strips;

guiding the negative pressure from the inner surface side of the conveyor belt, through apertures in the conveyor belt distributed at a rate of at least one for each of the objects, to the space between the adjacent seal strips; and conveying the objects while drawing the objects to the seal strips by a suction force produced by the negative pressure.

2. An apparatus for conveying objects for inspection, comprising:

a conveyor belt for conveying the objects which comprises a belt core material having an annular shape made of many rigid thread elements involving the apertures for communicating the inner and outer surfaces of the belt core material with each other, the apertures being distributed at a rate of at least one for each of the objects, and a plurality of the seal strips arranged in parallel with and spaced apart from one another, each of the seal strips being annular and continuous in the conveying direction, the seal strips being formed integral with the belt core material, each of the seal strips having an inner seal strip protruding from the inner surface of the belt core material, so as to block the communication between the inner and outer surfaces of the belt core material, the objects to be inspected being seated over adjacent ones of the seal strips;

a drive means engaging with the conveyor belt, for driving the same in a manner to cause no slippage between them in a conveying direction; and a suction means for guiding a negative pressure from the inner surface side of the conveyor belt to a space between adjacent seal strips through apertures of a belt core material of the conveyor belt, and drawing the objects to the seal strips by a suction force produced by the negative pressure.

3. An apparatus for conveying objects for inspection according to claim 2, wherein the conveyor belt has three or more seal strips to seat rows of the objects over adjacent ones of the seal strips.

4. An apparatus for conveying objects for inspection according to claim 2, wherein the suction means has a box-like structure having an outer wall facing the inner surface of the conveyor belt, and the outer wall has slits or apertures facing the inner seal strips, for drawing the seal strips.

5. An apparatus for conveying objects for inspection according to claim 2, wherein the suction means has a box-like structure having an outer wall facing the inner surface of the conveyor belt, and the outer wall has slits each facing a space between adjacent seal strips, for drawing the objects seated over the adjacent seal strips.

6. An apparatus for conveying objects for inspection according to claim 2, wherein the conveyor belt includes seats protruding from the outer surface thereof to receive the objects.

7. An apparatus for conveying objects for inspection according to claim 6, wherein the seats are integrally formed with the seal strips.

8. An apparatus for conveying objects for inspection according to claim 2, wherein the conveyor belt has holes opened at equal intervals in the conveying direction, and the drive means has sprockets engaging with the holes.

9. An apparatus for conveying objects for inspection according to claim 2, wherein a part of the inner surface of the conveyor belt has irregularities formed in the conveying direction, and the drive means has timing pulleys engaging with the irregularities.

10. An apparatus for conveying objects for inspection according to claim 2, wherein the belt core material comprises thread elements woven into a net.

11. An apparatus for conveying objects for inspection according to claim 2, wherein the belt core material comprises thread elements extending orthogonally to the conveying direction and arranged in a blind-like configuration.

12. An apparatus for conveying objects for inspection according to claim 2, wherein the thread elements are coated with a good lubricant.

* * * * *